(12) United States Patent
LaMarca et al.

(10) Patent No.: US 8,424,924 B2
(45) Date of Patent: Apr. 23, 2013

(54) ELECTROMAGNETIC BOND WELDING OF THERMOPLASTIC PIPE DISTRIBUTION SYSTEMS

(75) Inventors: Drew LaMarca, Whippany, NJ (US); Tom Zich, Vernon, NJ (US)

(73) Assignee: TAS Acquisition Co., LLC, Rochester Hills, MI (US)

( * ) Notice: Subject to any disclaimer, the term of this patent is extended or adjusted under 35 U.S.C. 154(b) by 581 days.

(21) Appl. No.: 12/486,874

(22) Filed: Jun. 18, 2009

(65) Prior Publication Data

US 2010/0072742 A1    Mar. 25, 2010

Related U.S. Application Data

(60) Provisional application No. 61/192,614, filed on Sep. 19, 2008.

(51) Int. Cl.
   *F16L 13/00*    (2006.01)
(52) U.S. Cl.
   USPC ........................ 285/285.1; 285/21.1
(58) Field of Classification Search ............. 285/21.1, 285/21.2, 21.3, 22, 285.1, 288.1; 219/607, 219/612, 613, 614, 633, 634
   See application file for complete search history.

(56) References Cited

U.S. PATENT DOCUMENTS

| | | |
|---|---|---|
| 4,486,650 A | 12/1984 | Bridgstock et al. |
| 4,495,970 A | 1/1985 | Pate et al. |
| 4,571,488 A | 2/1986 | Reeves |
| 4,947,012 A | 8/1990 | Minarovic |
| 4,978,825 A | 12/1990 | Schmidt et al. |
| 5,036,210 A | 7/1991 | Goodman |
| 5,228,186 A | 7/1993 | Brettell et al. |
| 5,252,157 A | 10/1993 | Inhofe, Jr. |
| 5,254,824 A | 10/1993 | Chamberlain et al. |
| 5,286,952 A * | 2/1994 | McMills et al. .............. 219/535 |
| 5,338,920 A | 8/1994 | Okusaka et al. |
| 5,505,898 A | 4/1996 | Goto et al. |
| 5,524,674 A | 6/1996 | Platusich |

(Continued)

FOREIGN PATENT DOCUMENTS

| | | |
|---|---|---|
| DE | 10 2005 014339 | 6/2006 |
| EP | 0 333 379 | 9/1989 |

(Continued)

OTHER PUBLICATIONS

U.S. Appl. No. 12/214,502, filed Jun. 19, 2008.

(Continued)

*Primary Examiner* — Aaron Dunwoody

(57) ABSTRACT

A thermoplastic pipe distribution system is assembled by electromagnetic bond welding of a thermoplastic pipe to a thermoplastic fusion pipe joint assembly comprising a threaded fusion pipe ring, a threaded fusion pipe socket, and a susceptor layer between the fusion pipe ring and the fusion pipe socket. The fusion pipe ring is screwed into the fusion pipe socket, and the pipe is inserted into the fusion pipe ring. An induction coil is placed around the fusion pipe socket. Radiated electromagnetic energy heats the susceptor layer to melt at least a portion of the susceptor layer, at least a portion of the fusion pipe ring, at least a portion of the fusion pipe socket, and at least a portion of the pipe. The fusion pipe ring is further screwed in to compress the molten material. The joint is then cooled to solidify the molten material.

42 Claims, 13 Drawing Sheets

VIEW A

U.S. PATENT DOCUMENTS

| | | | |
|---|---|---|---|
| 5,655,592 A * | 8/1997 | Sullivan | 164/456 |
| 5,988,689 A | 11/1999 | Lever | |
| 6,056,844 A | 5/2000 | Guiles et al. | |
| 6,193,834 B1 | 2/2001 | Smith | |
| 6,939,477 B2 | 9/2005 | Stark et al. | |
| 2005/0184060 A1 | 8/2005 | Stark et al. | |
| 2006/0091887 A1 | 5/2006 | Aisenbrey | |
| 2007/0200342 A1 | 8/2007 | Roberts-Moore et al. | |
| 2008/0187697 A1 | 8/2008 | Amano | |
| 2008/0292824 A1 | 11/2008 | Haeger et al. | |
| 2009/0004466 A1 | 1/2009 | LaMarca et al. | |
| 2009/0014439 A1 * | 1/2009 | Kim | 219/634 |
| 2009/0127253 A1 | 5/2009 | Stark et al. | |

FOREIGN PATENT DOCUMENTS

| | | |
|---|---|---|
| EP | 1 079 167 | 2/2001 |
| EP | 1 388 703 | 2/2004 |
| GB | 2 273 260 | 6/1994 |
| JP | 10 185066 | 7/1998 |
| WO | WO 88 06517 | 9/1988 |
| WO | WO 9822744 | 5/1998 |
| WO | WO2007/091799 | 8/2007 |
| WO | WO 2007128384 | 11/2007 |
| WO | WO 2009002528 | 12/2008 |

OTHER PUBLICATIONS

International Search Report corresponding to PCT International Application No. PCT/US2009/005054 filed Sep. 9, 2009 (5 pages).

Written Opinion of the International Searching Authority corresponding to PCT International Application No. PCT/US2009/005054 filed Sep. 9, 2009 (8 pages).

* cited by examiner

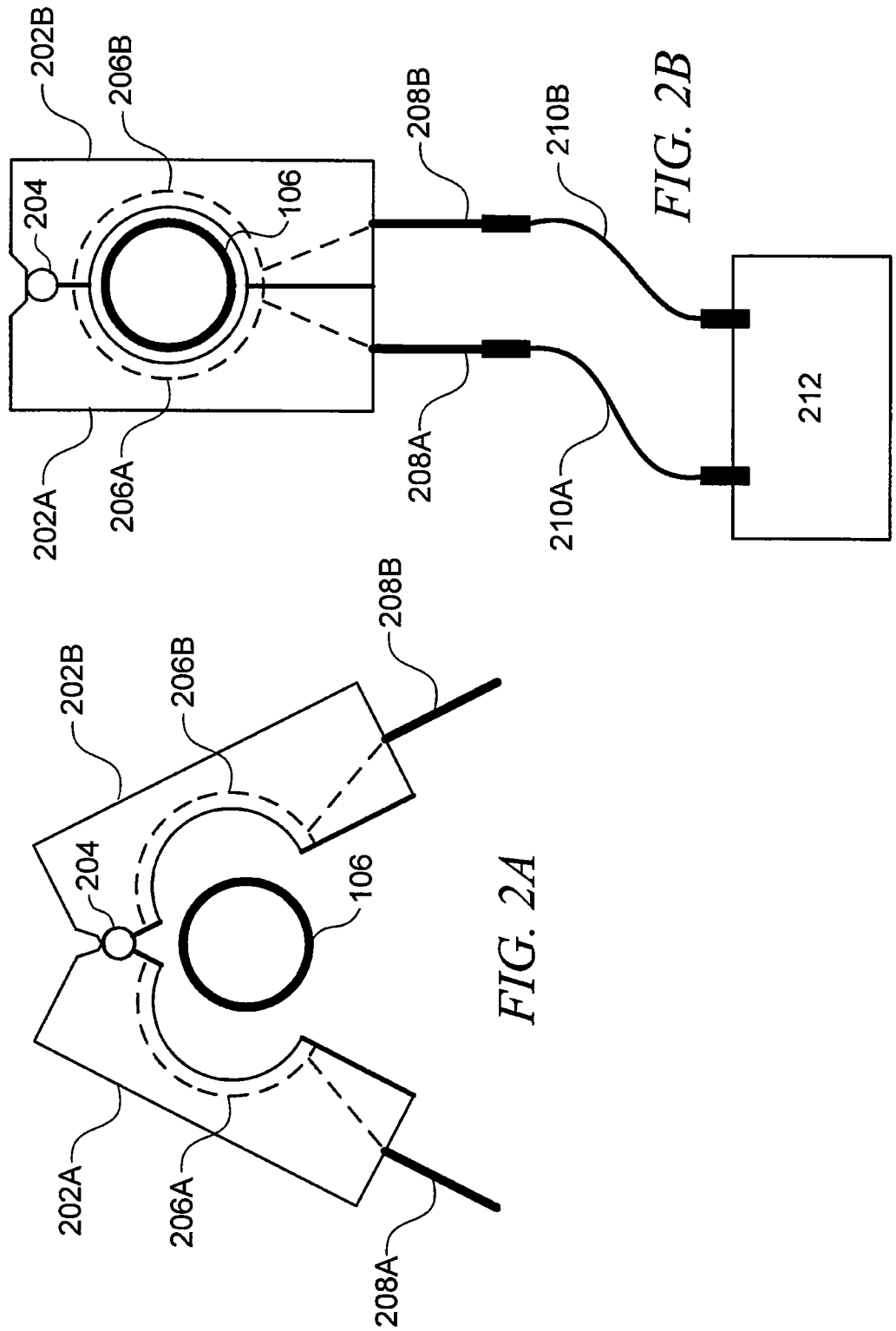

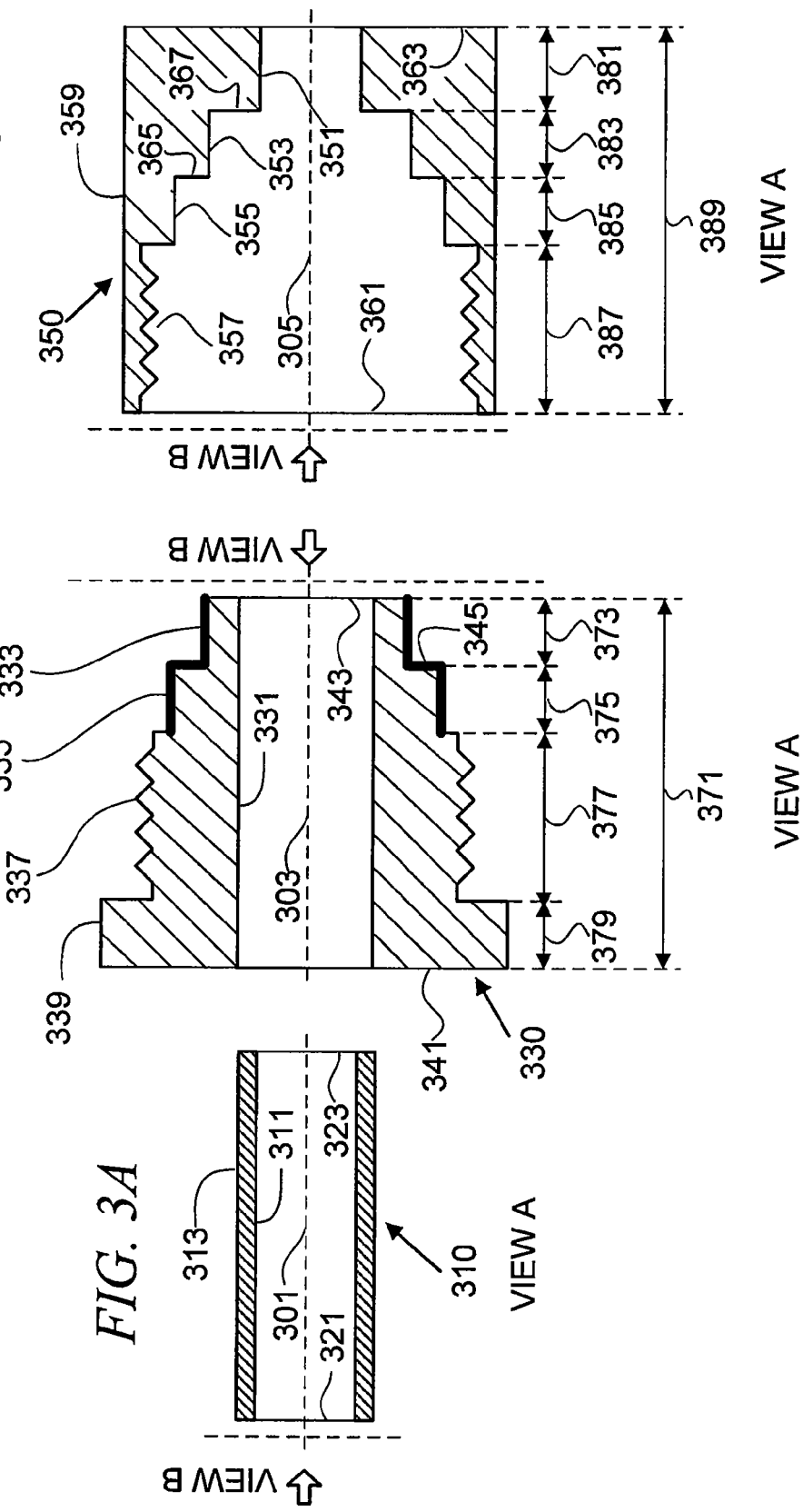

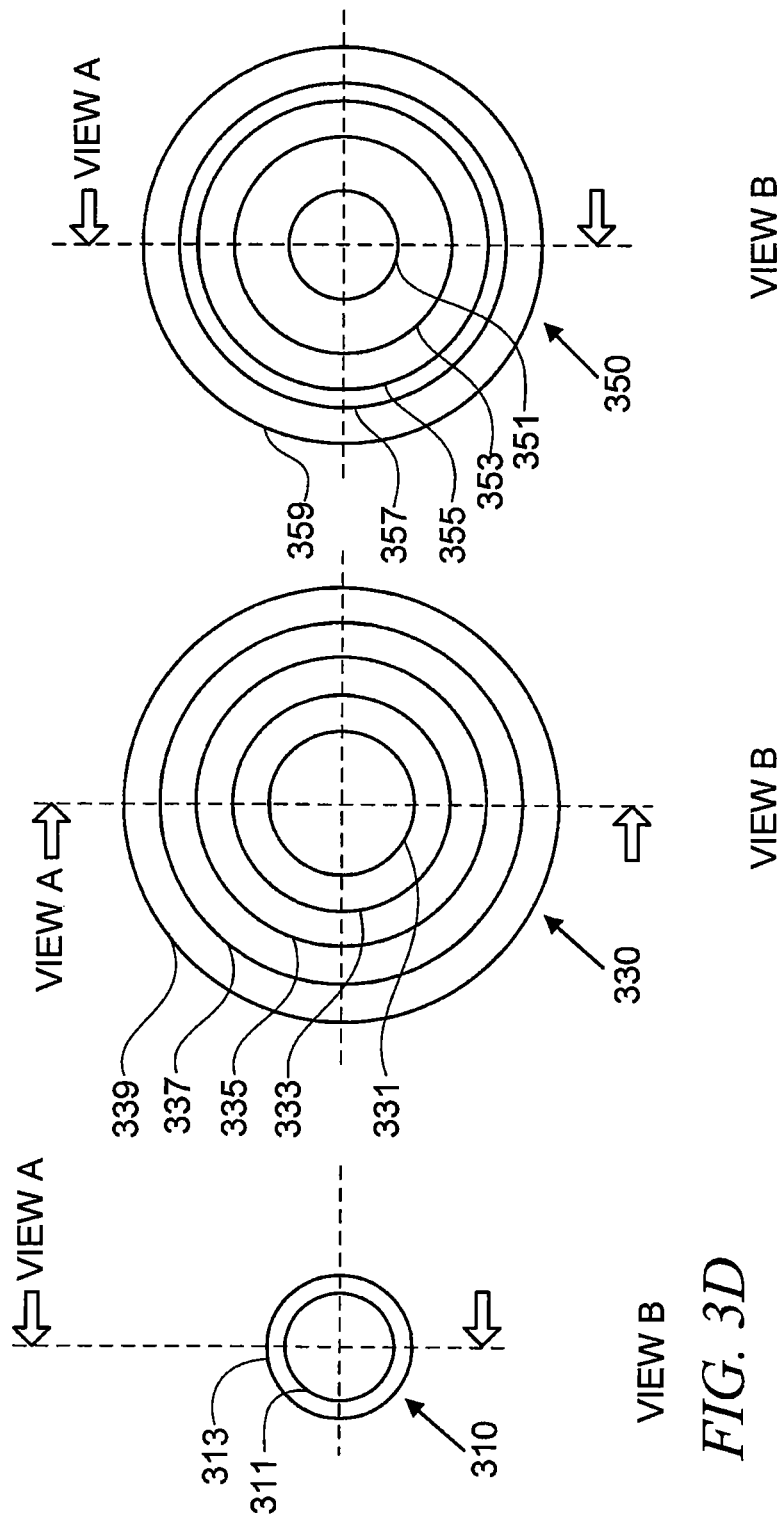

VIEW A

VIEW A

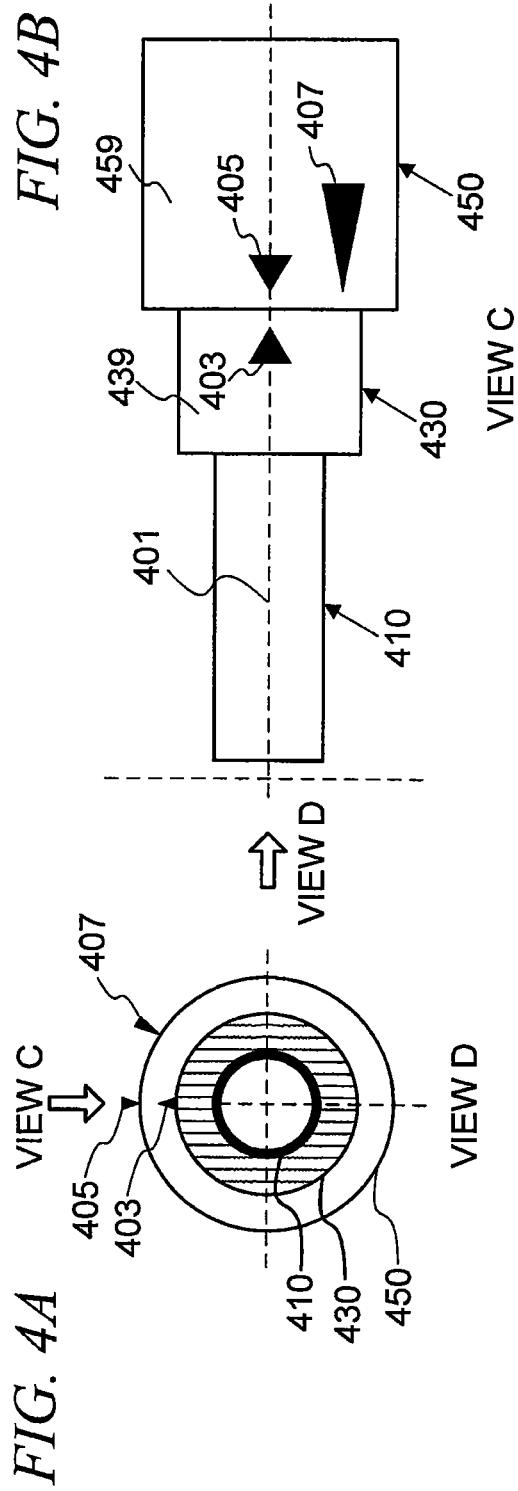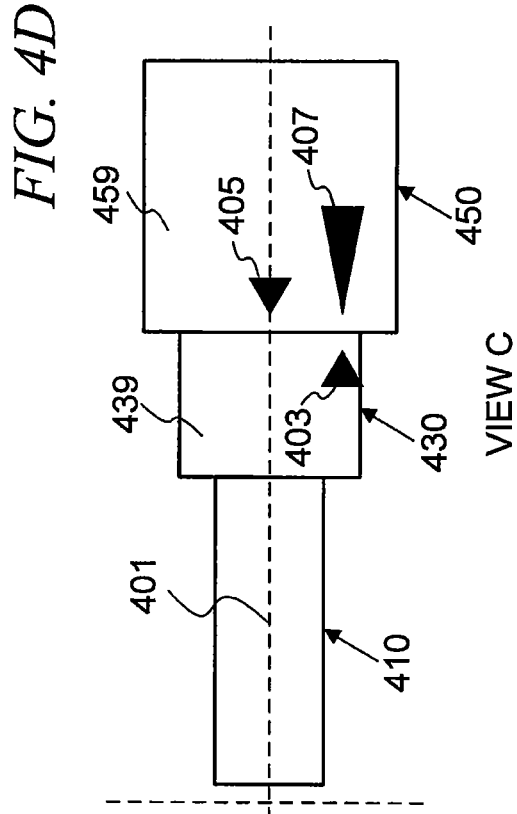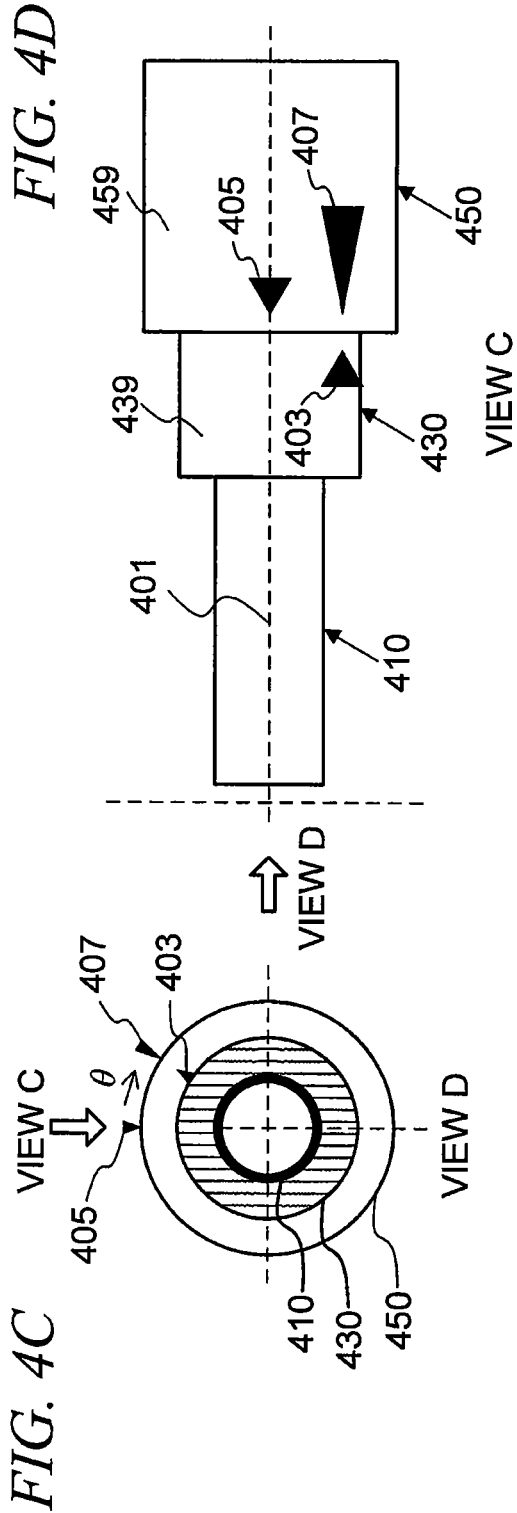

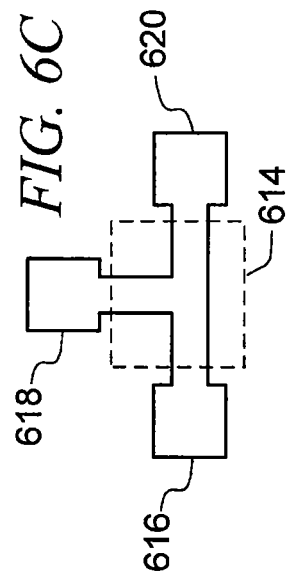
FIG. 6A
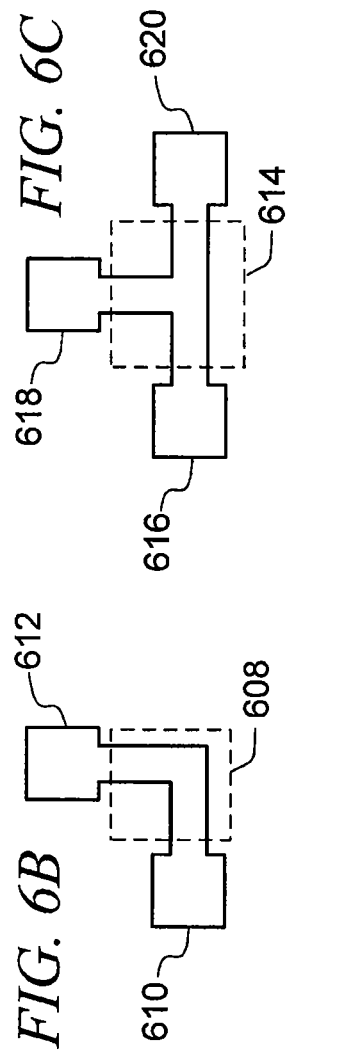
FIG. 6B
FIG. 6C
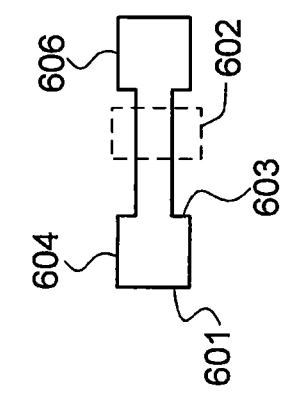
FIG. 6D
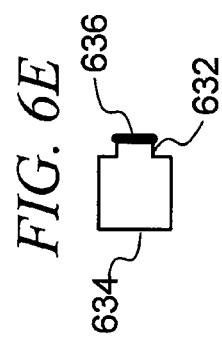
FIG. 6E
FIG. 6F
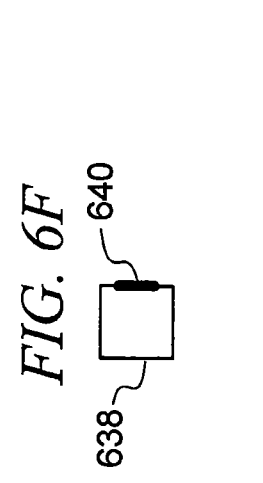
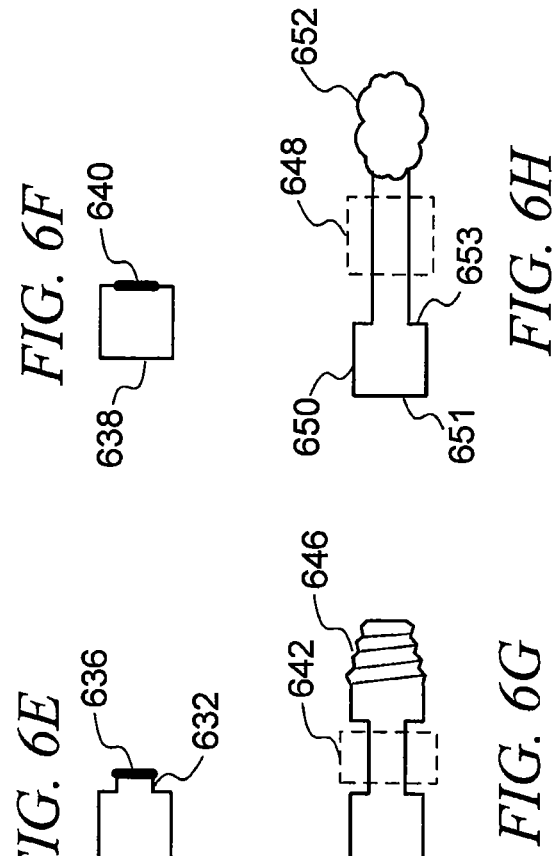
FIG. 6G
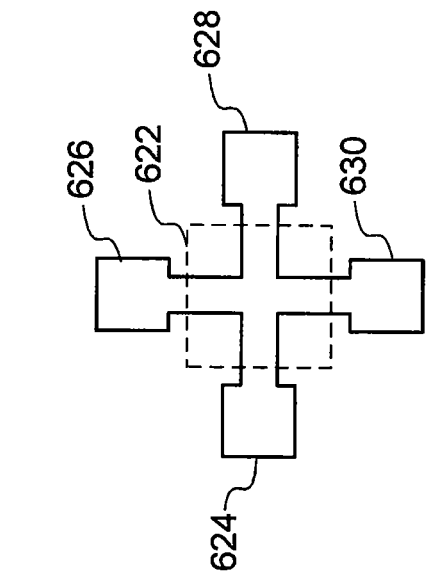
FIG. 6H

ELECTROMAGNETIC BOND WELDING OF THERMOPLASTIC PIPE DISTRIBUTION SYSTEMS

This application claims the benefit of U.S. Provisional Application No. 61/192,614 filed Sep. 19, 2008, which is incorporated herein by reference.

BACKGROUND OF THE INVENTION

The present invention relates generally to plumbing, and more particularly to electromagnetic bond welding of thermoplastic pipe distribution systems.

Plumbing systems for transporting water in residential, commercial, and industrial applications are conventionally based on copper pipe distribution systems. On a job site, a plumber typically pieces together a copper pipe distribution system by joining together two or more pipes via various fittings, such as couplers, elbows, tees, and crosses. A copper pipe may also be joined to various termination fittings, such as end caps, plugs, threaded adapters, and unions. The fittings themselves are typically fabricated also from copper, but other metals such as brass may be used.

In conventional practice, a copper pipe is joined to a fitting by soldering. The pipe is inserted into the fitting; the joint region is heated with a torch; solder is melted into the joint; the joint is allowed to cool; and the solder solidifies. Although copper plumbing has been widely used, it does suffer from a number of disadvantages. Creating a reliable joint requires proper preparation of the pipe and fitting (for example, removing dirt and oxide from the surfaces to be joined); heating the joint to the proper temperature range; applying the solder uniformly; and cooling the joint at the proper rate. All these operations are manually intensive and require a skilled operator (plumber). The soldering operation itself poses a potential fire hazard and releases fumes.

Alternative materials for plumbing distribution systems have been developed. One class of materials comprises thermoplastics, which are lightweight and have high chemical resistance. Fittings and on-site methods for quickly and reliably joining thermoplastic pipe are desirable.

BRIEF SUMMARY OF THE INVENTION

In an embodiment of the invention, a thermoplastic pipe distribution system is assembled by electromagnetic bond welding of a thermoplastic pipe to a thermoplastic fusion pipe joint assembly comprising a threaded fusion pipe ring, a threaded fusion pipe socket, and a susceptor layer between the fusion pipe ring and the fusion pipe socket. The fusion pipe ring is screwed into the fusion pipe socket, and the pipe is inserted into the fusion pipe ring. An induction coil is placed around the fusion pipe socket. Radiated electromagnetic energy heats the susceptor layer to melt at least a portion of the susceptor layer, at least a portion of the fusion pipe ring, at least a portion of the fusion pipe socket, and at least a portion of the pipe. The fusion pipe ring is further screwed in to compress the molten material. The joint is then cooled to solidify the molten material.

In another embodiment of the invention, the susceptor layer is heated to a first temperature sufficient for the susceptor layer to flow. The fusion pipe ring is further screwed in. The susceptor layer is then heated to a second temperature sufficient to melt at least a portion of the susceptor layer, at least a portion of the fusion pipe ring, at least a portion of the fusion pipe socket, and at least a portion of the pipe. The joint is then cooled to solidify the molten material.

In an embodiment of the invention, a fusion pipe ring comprises a front face, a rear face, an inside surface region, and an outside surface region comprising a thermoplastic material threaded with an outside thread configured to engage with the inside thread of a fusion pipe socket. A susceptor layer is disposed on the outside surface region. In one embodiment of the invention, the susceptor layer is integrated with the outside surface region. In another embodiment of the invention, the susceptor layer is a separate susceptor ring. In other embodiments, a fusion pipe ring comprises additional outside surface regions configured to mate with corresponding inside surface regions in a fusion pipe socket. Susceptor layers may be disposed on the additional outside surface regions.

In an embodiment of the invention, a temperature indicator, such as a thermochromatic dye, is disposed on the fusion pipe ring to indicate when the fusion pipe ring has been heated. In an embodiment of the invention, at least one index marker is disposed on the fusion pipe ring to indicate a relative position of the fusion pipe ring with respect to a fusion pipe socket.

In an embodiment of the invention, a fitting comprises at least one fusion pipe socket connected by a connection region. Fittings may be configured in various forms, such as couplers, elbows, tees, crosses, end caps, and adapters. In an embodiment of the invention, a fusion pipe socket comprises a front face, a rear face, an outside surface region, and an inside surface region comprising a thermoplastic material threaded with an inside thread configured to engage the outside thread of a fusion pipe ring. A susceptor layer is disposed on the inside surface region. In one embodiment of the invention, the susceptor layer is integrated with the inside surface region. In another embodiment of the invention, the susceptor layer is a separate susceptor ring. In other embodiments, a fusion pipe socket comprises additional inside surface regions configured to mate with corresponding outside surface regions of a fusion pipe ring. Susceptor layers may be disposed on the additional inside surface regions.

In an embodiment of the invention, a temperature indicator, such as a thermochromatic dye, is disposed on the fusion pipe socket to indicate when the fusion pipe socket has been heated. In an embodiment of the invention, at least one index marker is disposed on the fusion pipe socket to indicate a relative position of the fusion pipe socket with respect to a fusion pipe ring.

These and other advantages of the invention will be apparent to those of ordinary skill in the art by reference to the following detailed description and the accompanying drawings.

BRIEF DESCRIPTION OF THE DRAWINGS

FIG. 2A and FIG. 2B show a schematic of a clamp-on induction coil;

FIG. 3A-FIG. 3F show embodiments of components for constructing a thermoplastic pipe distribution system;

FIG. 4A-FIG. 4D show a method for indicating that an electromagnetic bond weld has been performed;

FIG. 6A-FIG. 6H show embodiments of various fittings; and

DETAILED DESCRIPTION

Figure 1:
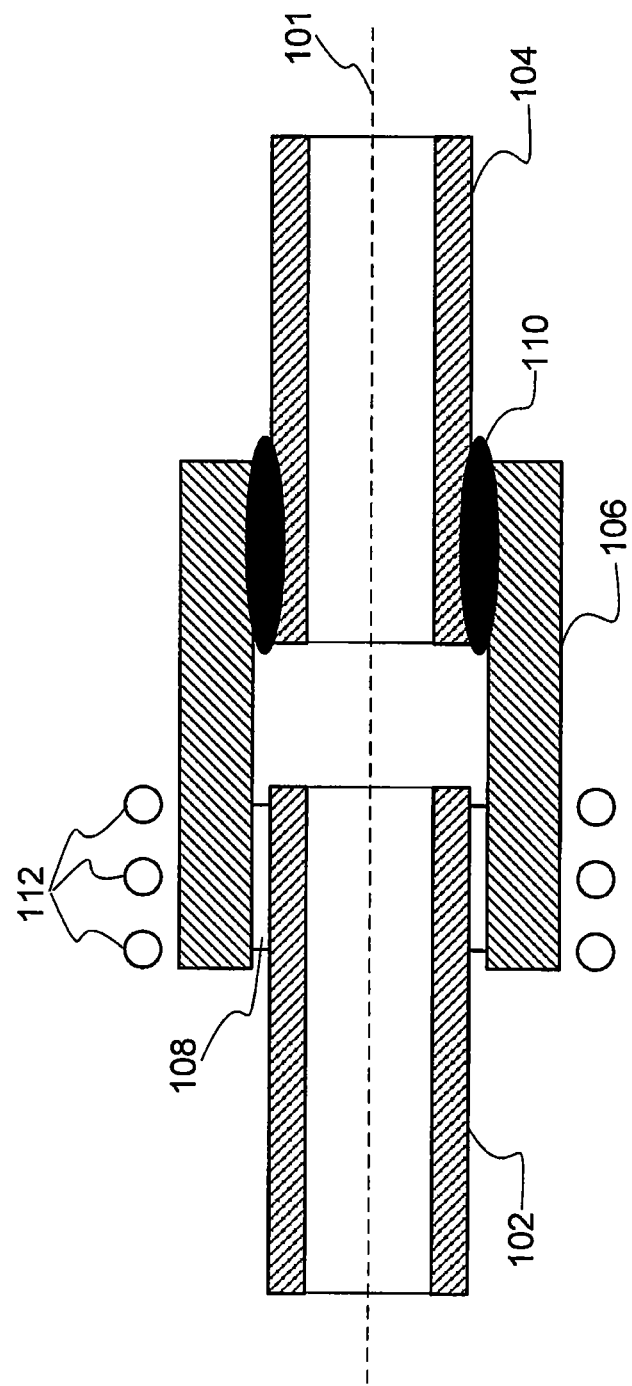
FIG. 1 shows a general schematic of two thermoplastic pipes joined by electromagnetic bond welding.

Thermoplastic materials suitable for plumbing distribution systems include, but are not limited to, acrylonitrile butadiene styrene (ABS), polyethylene (PE), polyethylene of raised-temperature (PE-RT), polypropylene (PP), polyvinyl chloride (PVC), and polyphenylene sulfide (PPS). In an embodiment of the invention, PE-RT multilayer pipe (see below for a discussion of multilayer pipe) is used for residential, commercial, and industrial plumbing systems to distribute both cold water and hot water (for example, water temperatures up to 180 deg F. and water pressures up to 100 psi). In another embodiment of the invention, PPS pipe is used for commercial solar thermal systems that collect solar energy and transport thermal energy via heated water or steam (for example, temperatures up to 300 deg F. and pressures up to 50 psi).

Herein, thermoplastic pipes include pipes fabricated from a single thermoplastic material (for example, PP throughout) and pipes fabricated with a multilayer composition. Multilayers are used to provide a better combination of mechanical and chemical properties (for example, weight, rigidity, strength, chemical resistance, service pressure, service temperature, and oxygen permeability) than can be achieved by a single material. One form of PE-RT multilayer pipe, for example, comprises layers of PE-RT/EVOH/PE-RT. The EVOH (ethylene vinyl alcohol copolymer) intermediate layer serves as an oxygen barrier. Additional adhesive layers may also be present in commercial PE-RT multilayer pipe. A second form of PE-RT multilayer pipe comprises layers of PE-RT/aluminum/PE-RT. The aluminum layer provides added rigidity and allows a higher service pressure. In general, a thermoplastic multilayer pipe comprises an arbitrary number of layers [outside layer (outside wall), one or more intermediate layers, and inside layer (inside wall)]. The outside layer is formed from a thermoplastic material. The intermediate layers and the inside layer may be formed from thermoplastic or non-thermoplastic materials. Examples of non-thermoplastic materials include, but are not limited to, metals, glasses, ceramics, thermoset plastics, and adhesives.

In the examples discussed below, pipes have a circular cross-section (sliced perpendicular to the longitudinal axis of the pipe). In general, a pipe may have an arbitrary cross-section, such as elliptical, square, rectangular, hexagonal, or irregular. In the discussions below, thermoplastic pipe distribution systems suitable for the transport of cold water, hot water, and steam, are used as examples. One skilled in the art, however, may develop embodiments of the invention adapted for thermoplastic pipe distribution systems designed for the transport of any fluid. Fluids include liquids (such as water, oil, gasoline, and alcohol) and gases (such as steam, natural gas, propane, and compressed air).

In an embodiment of the invention, a thermoplastic pipe is joined to a thermoplastic fitting via electromagnetic bond welding, such as described in US Patent Application Publication No. 2009/0004466, published Jan. 1, 2009, which is incorporated by reference herein, and in U.S. patent application Ser. No. 12/214,502, filed Jun. 19, 2008, which is incorporated by reference herein.

The basic principles of electromagnetic bond welding are illustrated in FIG. 1, which shows a longitudinal cross-sectional view of two thermoplastic pipes joined by a thermoplastic fitting (coupler). The longitudinal cross-section is sliced parallel to the common longitudinal axis 101 of the pipes and fitting. Note that the material composition of each of the pipes and of the fitting may vary independently. That is, the material composition of the first pipe and the material composition of the second pipe may be the same or different; and the material composition of the fitting may be the same as the material composition of the first pipe, the same as the material composition of the second pipe, or different from the material compositions of both the first and second pipes.

Pipe 102 is inserted into coupler 106. In between the outside wall of pipe 102 and the inside wall of coupler 106 is a susceptor layer 108. Susceptor layer 108 is formed from a thermoplastic resin in which ferromagnetic particles are embedded. Examples of material compositions for a susceptor layer are discussed in US Patent Application Publication No. 2009/0004466 and U.S. patent application Ser. No. 12/214,502 (previously referenced). An electromagnetic coil 112 (also referred to as a work coil or induction coil) is placed around the coupler 106 over the joint region. The electromagnetic coil 112 is energized by a generator (not shown) and emits a time-varying electromagnetic field. The susceptor layer 108 absorbs electromagnetic energy via induction. The absorbed electromagnetic energy is converted to thermal energy (heat) sufficient to melt the susceptor layer 108, the adjacent portion of the inside wall of coupler 106, and the adjacent portion of the outside wall of pipe 102 to form a thermal-fusion bond. In FIG. 1, pipe 104 is joined to coupler 106 via thermal-fusion bond 110.

FIG. 2A and FIG. 2B show an embodiment of an electromagnetic coil assembly advantageously suited for on-site plumbing installations. FIG. 2A and FIG. 2B show end views (sighting along longitudinal axis 101 in FIG. 1) of coupler 106. To simplify the figures, pipes and susceptor layers are not shown. The electromagnetic coil assembly is configured as a split-clamp. FIG. 2A shows the split-clamp in the open position. Electromagnetic coil section 206A is encased in clamp section 202A. Electromagnetic coil section 206B is encased in clamp section 202B. Clamp section 202A and clamp section 202B are fabricated from an electrically-insulating material. Clamp section 202A and clamp section 202B are connected via pivot 204. Electromagnetic coil section 206A is electrically connected to electrode 208A. Electromagnetic coil section 206B is electrically connected to electrode 208B.

As shown in FIG. 2A, clamp section 202A and clamp section 202B are first opened and positioned around coupler 106. In FIG. 2B, clamp section 202A and clamp section 202B are closed. Electromagnetic coil section 206A and electromagnetic coil section 206B then surround coupler 106. Electrode 208A and electrode 208B are connected via lead wire 210A and lead wire 210B, respectively, to power supply 212. An example of power supply 212 is described in US Patent Application Publication No. 2009/0004466 and U.S. patent application Ser. No. 12/214,502 (previously referenced). Power supply 212 comprises a high-frequency power generator and a high-frequency tuner. The output of the high-frequency power generator is pulse-width modulated. The pulse-width modulation is controlled by a programmable microcontroller to create a desired thermal profile (temperature vs. time) during both heating and cooling. The frequency of the electromagnetic radiation may be tuned to the frequency at which the electromagnetic energy absorption coefficient of the susceptor layer 108 (FIG. 1) is high, allowing for high-efficiency conversion of electromagnetic to thermal energy. In an embodiment of the invention, power supply 212 is a compact, portable power supply advantageously suited for on-site installations.

One skilled in the art may develop other electromagnetic coil assemblies for on-site use. For example, two fully detachable electromagnetic coil sections, with suitable electrical connections, may be placed around the coupling and then bolted or clamped together.

In the basic example shown in FIG. 1, pipe 102, coupling 106, and susceptor layer 108 are held together by a simple slip fit prior to electromagnetic bond welding. In an embodiment of the invention, fittings are configured for greater ease of forming reliable joints.

FIG. 3A-FIG. 3C show longitudinal cross-sectional views (View A) of components for assembling a thermoplastic plumbing distribution system, according to an embodiment of the invention. FIG. 3D-FIG. 3F show corresponding end views (View B). Each of the components are fabricated from thermoplastic materials. As discussed above, thermoplastic materials include single-composition thermoplastic materials and multilayer thermoplastic materials. The compositions of the thermoplastic materials in each of the components may be different.

FIG. 3A (View A) and FIG. 3D (View B) show a pipe 310 with a hollow cylindrical form. View A (FIG. 3A) is a longitudinal cross-sectional view, sliced parallel to the longitudinal axis 301. View B (FIG. 3D) is an end view sighted along the longitudinal axis 301; that is, the plane of View B (FIG. 3D) is perpendicular to the longitudinal axis 301. Pipe 310 has an outside surface region 313 (also referred to as an outside wall) with an outside diameter and an inside surface region 311 (also referred to as an inside wall) with an inside diameter. The end faces are referenced as front face 321 and rear face 323. Pipe 310 is also referred to as a tube. The outside diameter and inside diameter may be user-specified. In an advantageous embodiment, the outside diameter and inside diameter conform to industry standards.

FIG. 3B (View A) and FIG. 3E (View B) show an embodiment of a fusion pipe ring 330, which has a tubular structure. View A (FIG. 3B) is a longitudinal cross-sectional view, sliced parallel to the longitudinal axis 303. View B (FIG. 3E) is an end view sighted along the longitudinal axis 303; that is, the plane of View B (FIG. 3E) is perpendicular to the longitudinal axis 303. Fusion pipe ring 330 has an inside surface region 331 with an inside diameter. Fusion pipe ring 330 has four outside surface regions. Each outside surface region has a corresponding diameter. The outside faces of fusion pipe ring 330 are referenced as front face 341 and rear face 343.

In the embodiment shown in FIG. 3B and FIG. 3E, outside surface region 339 has a circular profile [View B (FIG. 3E)]. In other embodiments, outside surface region 339 has a non-circular profile; for example, it may be elliptical, square, rectangular, hexagonal, or irregular. The outside surface region 339 may have various surface features. For example, it may be smooth, knurled, grooved, or threaded. It may also have tapers, protrusions, indents, or flats.

Outside surface region 337 is threaded (straight thread or tapered thread). The diameter of outside surface region 339 may be greater than, less than, or equal to the diameter of outside surface region 337. The diameter of outside surface region 337 is greater than the diameter of outside surface region 335. The diameter of outside surface region 335 is greater than the diameter of outside surface region 333. That is, outside surface region 335 and outside surface region 333 form a step with step face 345.

Lengths are measured parallel to the longitudinal axis 303. The overall length of fusion pipe ring 330 is length 371. The length of outside surface region 339 is length 379. The length of outside surface region 337 is length 377. The length of outside surface region 335 is length 375. The length of outside surface region 333 is length 373. One skilled in the art may specify appropriate design engineering parameters such as dimensions, tolerances, corner radii, thread form, thread pitch, and surface finish to accommodate different applications and different pipe diameters. In one example, for a pipe 310 with an outside diameter of ¾ in., the overall length 371 of fusion pipe ring 330 is approximately 1½ in. Embodiments of the invention may be applied to significantly smaller and larger diameters.

In the embodiment shown in FIG. 3B and FIG. 3E, a susceptor layer is integrated with outside surface region 335 and outside surface region 333. For example, a susceptor layer may be coated on a surface region or molded into a surface region. Herein, "a surface region" refers to any surface region (inside or outside, for example). As used herein, "a surface region" refers to a three-dimensional region. In other embodiments, the susceptor layer is not integrated with fusion pipe ring 330. The susceptor layer is then a separate item (not shown), such as a skin, sleeve, gasket, O-ring, washer, or ferrule, which is placed around outside surface region 335 and outside surface region 333. Herein, a separate susceptor layer in any form is referred to as a susceptor ring. A separate susceptor ring may be individually placed around outside surface region 335 and outside surface 333; or a single susceptor ring covering both surface region 335 and surface region 333 may be used. A fusion pipe ring may have one outside surface region with an integral susceptor layer and another outside surface region covered by a susceptor ring. Herein, a susceptor layer disposed on a surface region refers to a susceptor layer integrated with a surface region and refers to a susceptor ring placed on a surface region.

In other embodiments, fusion pipe ring 330, in part or in entirety, is fabricated from a susceptor material. For example, the entire portions indicated by length 375 and length 373 may be fabricated from a susceptor material. Note that an object fabricated from a susceptor material inherently has a susceptor layer integrated with a surface region.

In some embodiments, outside surface region 335 is entirely covered with a susceptor layer; in other embodiments, only a portion of outside surface region 335 is covered with a susceptor layer. Similarly, in some embodiments, outside surface region 333 is entirely covered with a susceptor layer; in other embodiments, only a portion of outside surface region 333 is covered with a susceptor layer. Herein, a surface region is covered with a susceptor layer if at least a portion of the surface region is covered with a susceptor layer (that is, either partial coverage or complete coverage). Similarly, a susceptor layer is disposed on a surface region if it partially or completely covers the surface region. In the embodiment shown in FIG. 3B and FIG. 3E, both outside surface region 335 and outside surface region 333 are covered by a susceptor layer. In some embodiments, outside surface region 335 is covered with a susceptor layer, and outside surface region 333 is not covered with a susceptor layer. In other embodiments, outside surface region 335 is not covered with a susceptor layer, and outside surface region 333 is covered with a susceptor layer.

In some embodiments, step face 345 is covered with a susceptor layer; in other embodiments, step face 345 is not covered with a susceptor layer. In some embodiments, rear face 343 is covered with a susceptor layer; in other embodiments, rear face 343 is not covered with a susceptor layer. In the embodiment shown in FIG. 3B and FIG. 3E, outside surface region 337 (threaded) is not covered with a susceptor layer; in other embodiments, outside surface region 337 is covered with a susceptor layer.

FIG. 3C (View A) and FIG. 3F (View B) show a fusion pipe socket 350, which has a tubular structure. View A (FIG. 3C) is a longitudinal cross-sectional view, sliced parallel to the longitudinal axis 305. View B (FIG. 3F) is an end view sighted along the longitudinal axis 305; that is, the plane of View B (FIG. 3F) is perpendicular to the longitudinal axis 305. In the embodiment shown in FIG. 3C and FIG. 3F, outside surface region 359 has a circular profile [View B (FIG. 3F)]. In other embodiments, outside surface region 359 has a non-circular profile; for example, it may be elliptical, square, rectangular, hexagonal, or irregular. The outside surface region 359 may have various surface features. For example, it may be smooth, knurled, grooved, or threaded. It may also have tapers, protrusions, indents, or flats.

Fusion pipe socket 350 has multiple inside surface regions. Each inside surface region has a corresponding diameter. The outside faces of fusion pipe socket 350 are referenced as front face 361 and rear face 363. Inside surface region 357 is threaded (straight or tapered) to engage the thread on outside surface region 337 on the fusion pipe ring 330 (FIG. 3B and FIG. 3E). Inside surface region 355 is configured to mate (as described in more detail below) with outside surface region 335 on the fusion pipe ring 330. Inside surface region 353 is configured to mate (as described in more detail below) with outside surface region 333 on the fusion pipe ring 330. Inside surface region 351 is a throughbore.

In the embodiment shown in FIG. 3C and FIG. 3F, the diameter of inside surface region 357 is greater than the diameter of inside surface region 355. The diameter of inside surface region 355 is greater than the diameter of inside surface region 353. The diameter of inside surface region 353 is greater than the diameter of inside surface region 351. That is, inside surface region 355 and inside surface region 353 form a step with step face 365; and inside surface region 353 and inside surface region 351 form a step with step face 367. In some embodiments, the diameter of inside surface region 351 is greater than the diameter of inside surface region 353.

Lengths are measured parallel to the longitudinal axis 305. The overall length of fusion pipe socket 350 is length 389. The length of inside surface region 357 is length 387. The length of inside surface region 355 is length 385. The length of inside surface region 353 is length 383. The length of inside surface region 351 is length 381. One skilled in the art may specify appropriate design engineering parameters such as dimensions, tolerances, corner radii, thread form, thread pitch, and surface finish to accommodate different applications and different pipe diameters. In one example, for a pipe 310 with an outside diameter of ¾ in., the overall length 389 of fusion pipe socket 350 is approximately 1⅛ in. Embodiments of the invention may be applied to significantly smaller and larger diameters.

In some embodiments, there is no susceptor layer in fusion pipe socket 350. In other embodiments, at least a portion (partial or total coverage) of one or more of inside surface region 357, inside surface region 355, inside surface region 353, step face 365, and step face 367 is covered with a susceptor layer. An inside surface region or step face may be covered by an integral susceptor layer or by a susceptor ring. Fusion pipe socket 350 may also be fabricated (in part or in entirety) from a susceptor material.

Figure 3G:
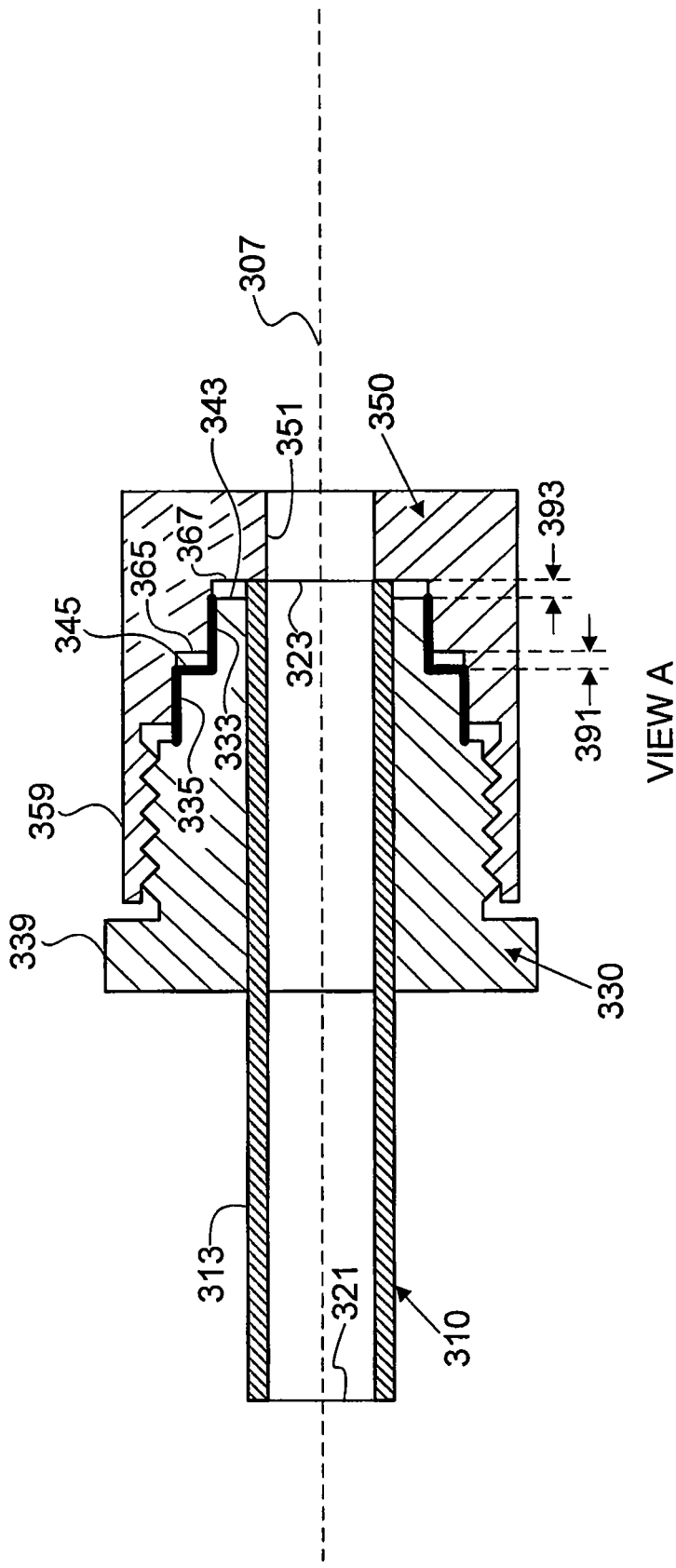
FIG. 3G shows an embodiment of assembled components prior to electromagnetic bond welding.

FIG. 3G shows a longitudinal cross-sectional view (View A), sliced parallel to the common longitudinal axis 307, of the assembled components. Herein, a fusion pipe joint assembly comprises a fusion pipe ring, a fusion pipe socket, and a susceptor layer. Fusion pipe ring 330 is seated into fusion pipe socket 350 and screwed in. In the embodiment shown in FIG. 3G, the diameter of inside surface region 351 in fusion pipe socket 350 is less than the diameter of outside surface 313 of pipe 310. Pipe 310 is inserted into fusion pipe ring 330 until rear face 323 of pipe 310 presses against step face 367 of fusion pipe socket 350. In some embodiments, there may be a susceptor layer between rear face 323 of pipe 310 and step face 367 of fusion pipe socket 350. In other embodiments, the diameter of inner surface region 351 in fusion pipe socket 350 is greater than the diameter of outside surface 313 of pipe 310, and a user-specified length of pipe 310 is inserted into fusion pipe ring 330 and fusion pipe socket 350.

Figure 3H:
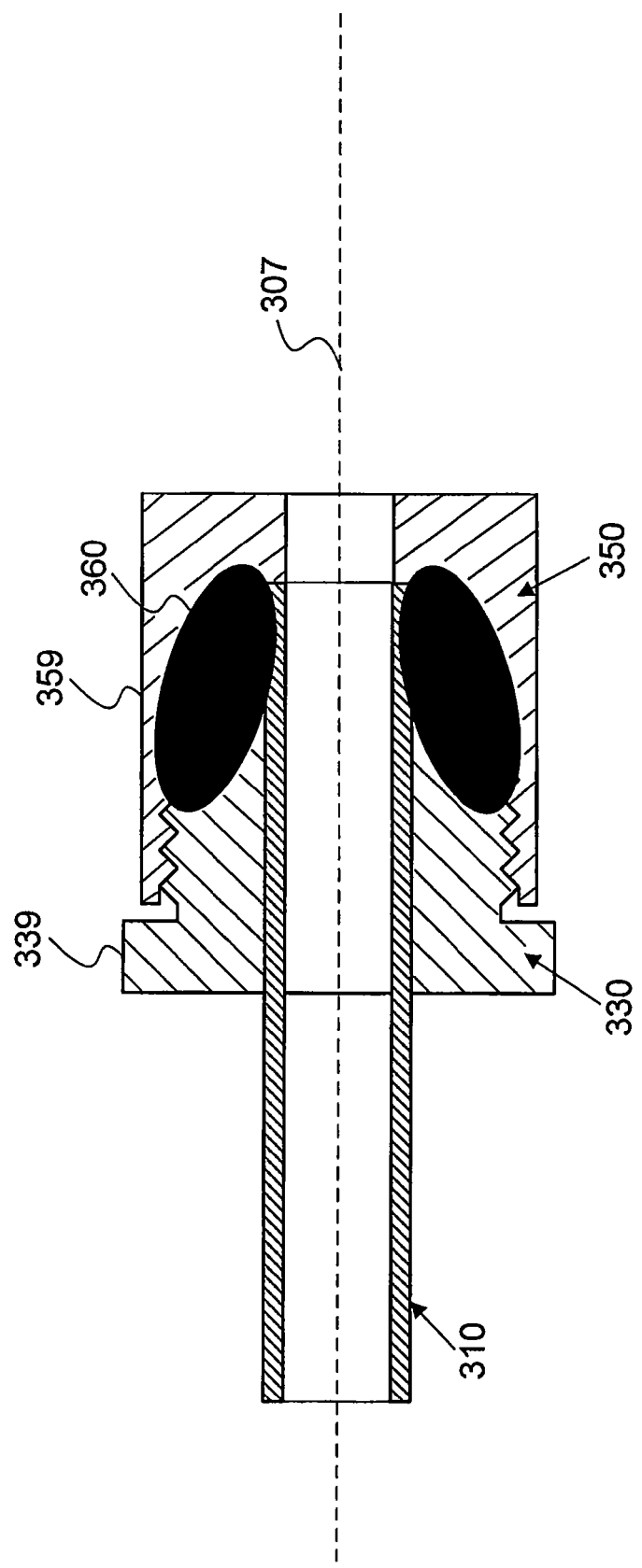
FIG. 3H shows an embodiment of assembled components after electromagnetic bond welding.

An induction coil (such as shown in FIG. 2A and FIG. 2B) is then placed around fusion pipe socket 350 to heat the susceptor layer. The susceptor layer is heated to a temperature (referred to as the fusion temperature) sufficient to melt at least a portion the susceptor layer and at least a portion of the pipe 310, fusion pipe ring 330, and fusion pipe socket 350 in the region near the susceptor layer. The fusion pipe ring 330 is then tightened to compress the molten material to create a more reliable bond. The joint region is cooled, and the molten material solidifies. FIG. 3H shows the final result. The fusion bond 360 represents the melted region of material, which includes at least a portion of the susceptor layer, at least a portion of fusion pipe ring 330, at least a portion of fusion pipe socket 350, and at least a portion of pipe 310. In some embodiments, regions of pipe 310, fusion pipe ring 330, and fusion pipe socket 350 away from fusion bond 360 may be formed from non-thermoplastic materials.

Fusion bond 360 may be controlled by various parameters such as the material compositions of pipe 310, fusion pipe ring 330, fusion pipe socket 350, and the susceptor layer; the joint geometry of pipe 310, fusion pipe ring 330, fusion pipe socket 350, and the susceptor layer; the frequency, power, and radiation pattern of the electromagnetic field emitted by the induction coil; the thermal profile (temperature vs. time) during the heating and cooling stages; and compression of the molten material. One skilled in the art may determine the appropriate range of parameters.

One skilled in the art may develop appropriate design parameters for the relative dimensions of pipe 310, fusion pipe ring 330, and fusion pipe socket 350 (see FIG. 3A-FIG. 3G). The diameter of the outside surface 335 of fusion pipe ring 330 and the diameter of the inside surface 355 of fusion pipe socket ring 350 may be configured to provide a user-specified clearance to accommodate various susceptor layers. The diameter of the outside surface 333 of fusion pipe ring 330 and the diameter of the inside surface 353 of fusion pipe socket 350 may be configured to provide a user-specified clearance to accommodate various susceptor layers. Similarly, length 375 and length 373 in the fusion pipe ring 330 and length 385 and length 383 in the fusion pipe socket 350 may be configured to provide user-specified clearance 391 between step face 345 of fusion pipe ring 330 and step face 365 of fusion pipe socket 350 and user-specified clearance 393 between rear face 343 of fusion pipe ring 330 and step face 367 of fusion pipe socket 350 (see FIG. 3G).

In the embodiment shown in FIG. 3B and FIG. 3E, fusion pipe ring 330 has four outside surface regions (outside surface region 339, outside surface region 337, outside surface region 335, and outside surface region 333) with respective lengths (length 379, length 377, length 375, and length 373). In other embodiments, there are fewer outside surface regions; or, equivalently, some of the lengths are zero. In other embodiments, there are more than four outside surface regions. In other embodiments, an outer surface region has a different geometry. For example, an outer surface region may be grooved to capture a susceptor O-ring.

Similarly, in the embodiment shown in FIG. 3C and FIG. 3F, fusion pipe socket 350 has four inside surface regions (inside surface region 357, inside surface region 355, inside surface region 353, and inside surface region 351) with respective lengths (length 387, length 385, length 383, and length 381). In other embodiments, there are fewer inside surface regions; or, equivalently, some of the lengths are zero. In other embodiments, there are more than four inside surface regions. In other embodiments, an inside surface region has a different geometry. For example, an inside surface region may be grooved to capture a susceptor O-ring.

Figure 3J:
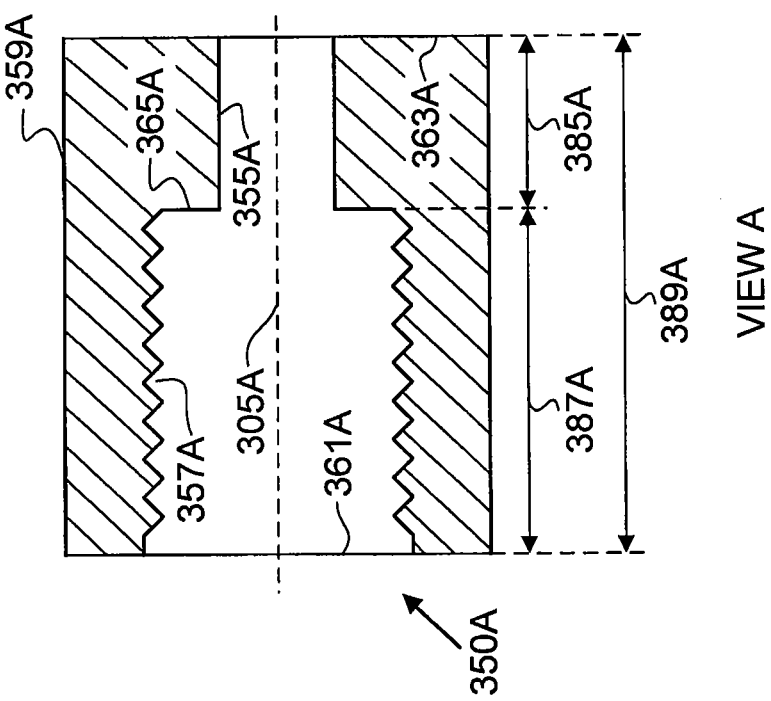
FIG. 3J shows another embodiment of a fusion pipe socket.
Figure 3I:
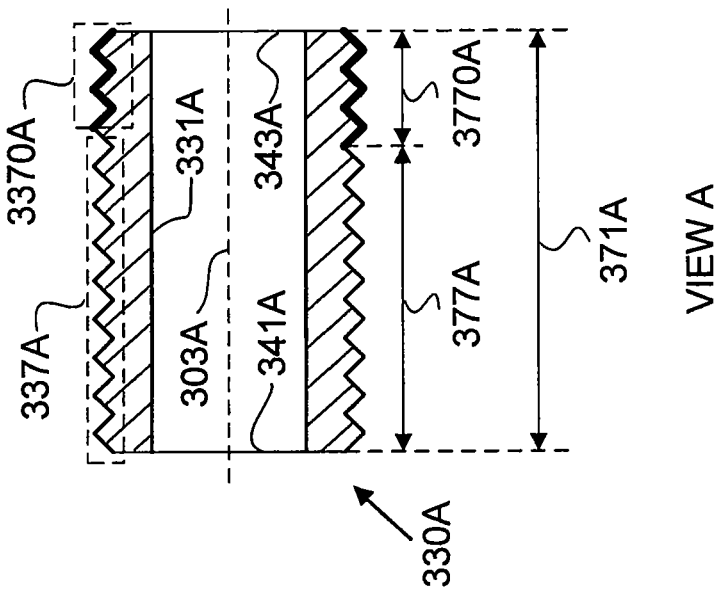
FIG. 3I shows another embodiment of a fusion pipe ring.

FIG. 3I and FIG. 3J show longitudinal cross-sectional views of other embodiments of a fusion pipe ring and a fusion pipe socket. FIG. 3I shows a longitudinal cross-sectional view (View A), sliced parallel to longitudinal axis 303A, of a fusion pipe ring 330A, which has an inside surface region 331A, an outside surface region 337A, and an outside surface region 3370A. Fusion pipe ring 330A has front face 341A and rear face 343A. The overall length of fusion pipe ring 330A is length 371A. The length of outside surface region 337A is length 377A. The length of outside surface region 3370A is length 3770A. Outside surface region 337A is threaded and has no susceptor layer. Outside surface region 3370A is threaded and has a susceptor layer.

FIG. 3J shows a longitudinal cross-sectional view (View A), sliced parallel to longitudinal axis 305A, of a fusion pipe socket 350A, which has an outside surface region 359A, an inside surface region 357A, and an inside surface region 355A. Fusion pipe socket 350A has front face 361A and rear face 363A. The diameter of inside surface region 357A is greater than the diameter of inside surface region 355A, forming step face 365A. The overall length of fusion pipe socket 350A is length 389A. The length of inside surface region 357A is length 387A. The length of inside surface region 355A is length 385A. Inside surface region 357A is threaded.

Figure 3K:
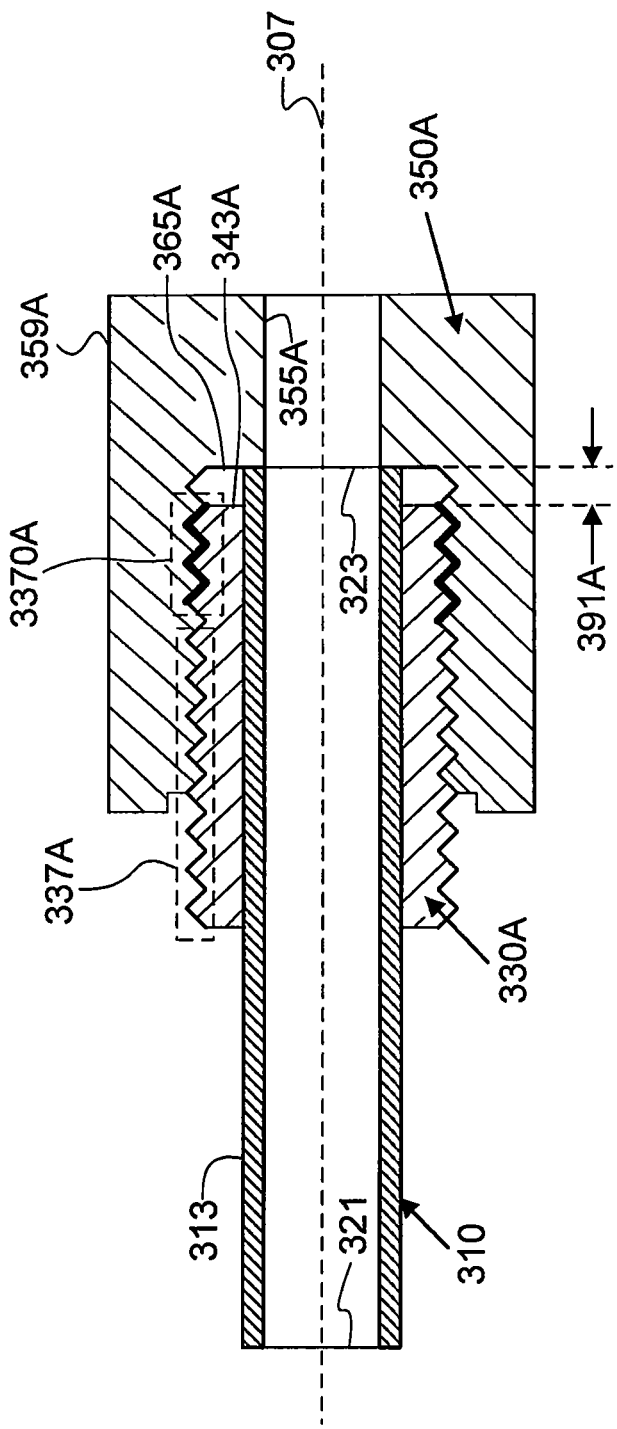
FIG. 3K shows another embodiment of assembled components prior to electromagnetic bond welding.

FIG. 3K shows a longitudinal cross-sectional view (View A), sliced parallel to the common longitudinal axis 307, of pipe 310, fusion pipe ring 330A, and fusion pipe socket 350A assembled prior to electromagnetic bond welding. Induction heating of the susceptor layer on outer surface region 3370A of fusion pipe ring 330A causes melting of at least a portion of the susceptor layer and adjoining regions of pipe 310, fusion pipe ring 330A, and fusion pipe socket 350A. Pipe ring 330A is then tightened to compress the molten region, and the joint is allowed to cool. In another embodiment, inside surface region 355A is absent (or, equivalently, length 385A in FIG. 3J is zero). The molten region is compressed between adjoining cold (solid) regions of pipe 310, fusion pipe ring 330A, and fusion pipe socket 350A.

During on-site installation of a thermoplastic plumbing distribution system, it is advantageous to readily verify by visual inspection that electromagnetic bond welding of a joint has actually been performed. In one embodiment of the invention (see FIG. 3B and FIG. 3C), a temperature indicator is disposed on fusion pipe ring 330 or fusion pipe socket 350 (or on both fusion pipe ring 330 and fusion pipe socket 350). In one embodiment, a temperature indicator is a material which melts when it has been heated to a specified temperature. After it has been melted, the appearance changes (for example, it changes from rough texture to smooth texture, or it changes from a lump to a film). Visual inspection of the temperature indicator indicates whether the joint was heated to a particular temperature range. Multiple materials with different melting points may be used. In another embodiment, one or more portions (including surface regions and faces) of fusion pipe ring 330 and fusion pipe socket 350 are coated with a thermochromatic dye that changes color when heated to a user-defined temperature. Visual inspection of the color can readily indicate that the joint has been heated. More than one thermochromatic dye (indicating different temperature ranges) may be applied on one or more portions of fusion pipe ring 330 and fusion pipe socket 350.

In another embodiment of the invention, shown schematically in FIG. 4A-FIG. 4C, performance of the fusion process is indicated by position of index markers. FIG. 4B (View C) shows an aerial view of pipe 410, fusion pipe fitting 430, and fusion pipe socket 450 assembled prior to heating. The common longitudinal axis is longitudinal axis 401. View D (FIG. 4A) is an end view sighted along the longitudinal axis 401; that is, the plane of View D (FIG. 4A) is perpendicular to the longitudinal axis 401. In the embodiment shown in FIG. 4A and FIG. 4B, the outside diameter of fusion pipe ring 430 is less than the outside diameter of fusion pipe socket 450. Index marker 403 is located on the outside surface region 439 of fusion pipe ring 430. Index marker 405 and index marker 407 are located on the outside surface region 459 of fusion pipe socket 450. Index marker 403, index marker 405, and index marker 407 may be fabricated by various means. In one embodiment, the index markers are created by ink, paint, or dye applied to outside surface region 439 and outside surface region 459. In another embodiment, the index markers are mechanical indents (such as grooves) created, for example, by engraving, stamping, or molding. In another embodiment, the index markers are mechanical protrusions (such as bumps) created, for example, by molding or fastening. Index markers may also be located on the faces of fusion pipe ring 430 and fusion pipe socket 450.

In FIG. 4A and FIG. 4B, fusion pipe ring 403 is tightened until index marker 403 is aligned with index marker 405. The relative radial angle is referenced as 0. The joint is then heated to fusion temperature. The fusion pipe ring 430 is then rotated by the relative radial angle θ until index marker 403 is aligned with index marker 407 (see FIG. 4C and FIG. 4D). The fusion joint is then cooled. Note that, alternatively, a single index marker may be located on outside surface region 459 of fusion pipe ring 450 and two index markers may be located on outside surface region 439 of fusion pipe ring 430. One skilled in the art may develop various mechanisms for indicating that a relative rotation between fusion pipe ring 430 and fusion pipe socket 450 has occurred. Index markers indicating the longitudinal spacing between the front face of fusion pipe ring 430 and the front face of fusion pipe socket 450 may also be used to indicate the relative position of fusion pipe ring 430 with respect to fusion pipe socket 450.

Figure 5:
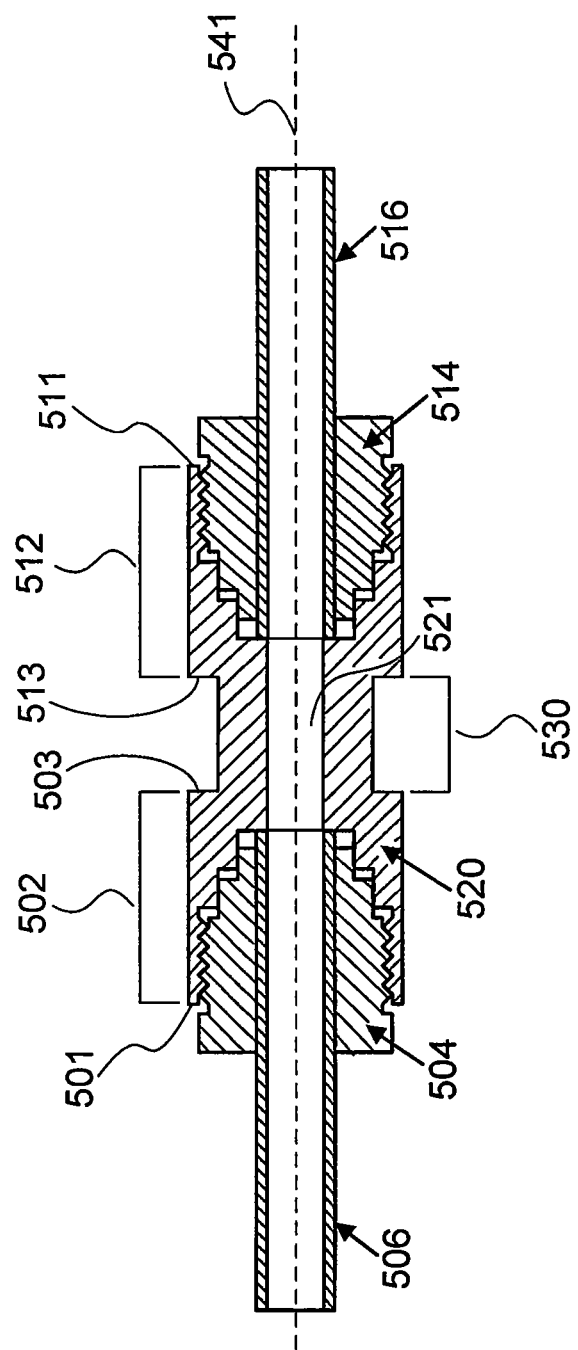
FIG. 5 shows a schematic of an assembly of two thermoplastic pipes, two fusion pipe rings, and a coupler fitting.

FIG. 5 shows a longitudinal cross-sectional view (sliced parallel to the common longitudinal axis 541) of two pipes joined by a coupler fitting 520, which includes fusion pipe socket 502 and fusion pipe socket 512 connected by connection region 530. Fusion pipe socket 502 has front face 501 and rear face 503. Fusion pipe socket 512 has front face 511 and rear face 513. Fusion pipe ring 504 is screwed into fusion pipe socket 502, and pipe 506 is inserted into fusion pipe ring 504. Fusion pipe ring 514 is screwed into fusion pipe socket 512, and pipe 516 is inserted into fusion pipe ring 514. Pipe 506, fusion pipe ring 504, and fusion pipe socket 502 are then joined together by induction heating of a susceptor layer on fusion pipe ring 504. Pipe 516, fusion pipe ring 514, and fusion pipe socket 512 are then joined together by induction heating of a susceptor layer on fusion pipe ring 514. Throughbore 521 in connection region 530 permits flow of fluids between pipe 506 and pipe 516.

Examples of various fittings according to embodiments of the invention are schematically illustrated in FIG. 6A-FIG. 6H. FIG. 6A shows a coupler fitting with fusion pipe socket 604 and fusion pipe socket 606 connected by connection region 602. A connection region is also referred to as the body of the fitting. The front face of fusion pipe socket 604 is referenced by front face 601 (corresponding to front face 361 of fusion pipe socket 350 shown in FIG. 3C); the rear face of fusion pipe socket 604 is referenced by rear face 603 (corresponding to rear face 363 of fusion pipe socket 350 shown in FIG. 3C). FIG. 6B shows a 90-degree elbow fitting with fusion pipe socket 610 and fusion pipe socket 612 connected by connection region 608. Elbow fittings with other angles (such as 45-degree elbows) may be similarly configured. FIG. 6C shows a tee fitting with fusion pipe socket 616, fusion pipe socket 618, and fusion pipe socket 620 connected by connection region 614. A Y fitting may be similarly configured. FIG. 6D shows a cross fitting with fusion pipe socket 624, fusion pipe socket 626, fusion pipe socket 628, and fusion pipe socket 630 connected by connection region 622. Distribution manifolds with more than four fusion pipe sockets may be similarly configured. Herein, a fitting also refers to a fusion pipe socket by itself and to a fusion pipe socket with a connection region.

FIG. 6E shows an end cap fitting in which fusion pipe socket 634 is sealed off with (solid) cap 636. Fusion pipe socket 634 and cap 636 are connected by connection region 632. In some embodiments, the connection region does not protrude from the rear face of the fusion pipe socket. FIG. 6F shows an example of an end cap fitting in which cap 640 is flush with the rear face of fusion pipe socket 638. In some embodiments, cap 640 may be recessed from the rear face of fusion pipe socket 638. In some embodiments, cap 640 has a hole or a threaded hole to serve as an adapter. FIG. 6G shows an adapter fitting with fusion pipe socket 644 and NPT (National Pipe Thread) nipple 646 connected by connection region 642.

FIG. 6H shows a schematic of a general embodiment of a fusion pipe socket 650 (with front face 651 and rear face 653) connected via a connection region 648 to a generic plumbing assembly 652. In FIG. 6A-FIG. 6D, plumbing assembly 652 comprises one or more fusion pipe sockets. In FIG. 6E and FIG. 6F, plumbing assembly 652 comprises an end cap. In FIG. 6G, plumbing assembly 652 comprises a threaded nipple. Other examples of plumbing assembly 652 include fixtures and units such as valves, gauges, and tanks. In some embodiments, plumbing assembly 652 is fabricated from thermoplastic materials. In other embodiments, plumbing assembly 652 is fabricated from non-thermoplastic materials (such as thermoset plastic, metal, glass, or ceramic) or from a combination of thermoplastic and non-thermoplastic materials. Connection region 653 provides the transition between dissimilar materials. Nipple 646 in FIG. 6G, for example, may be fabricated from brass, and connection 642 may include an adhesive bond between brass and thermoplastic.

One skilled in the art may specify appropriate design engineering parameters such as dimensions, tolerances, corner radii, thread form, thread pitch, and surface finish for a fitting, according to specific applications. One skilled in the art may specify appropriate thermoplastic materials for a fitting, according to specific service requirements (such as temperature, pressure, and chemical resistance). One skilled in the art may specify appropriate fabrication processes for a fitting. For example, a fitting as shown in FIG. 6A-FIG. 6F may be molded as a single piece.

Figure 7A:
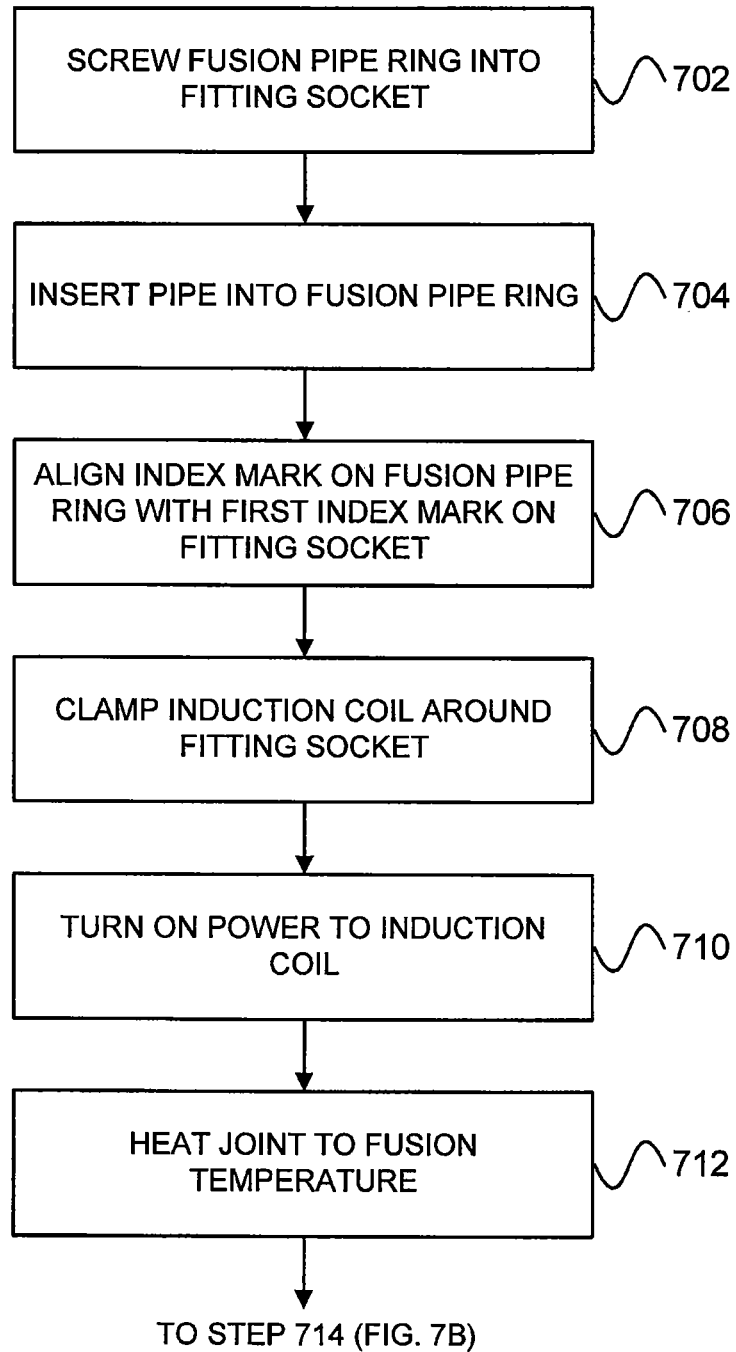
FIG. 7A and FIG. 7B show a flowchart of steps for electromagnetic bond welding of a thermoplastic pipe, a fusion pipe ring, and a fusion pipe socket.
Figure 7B:
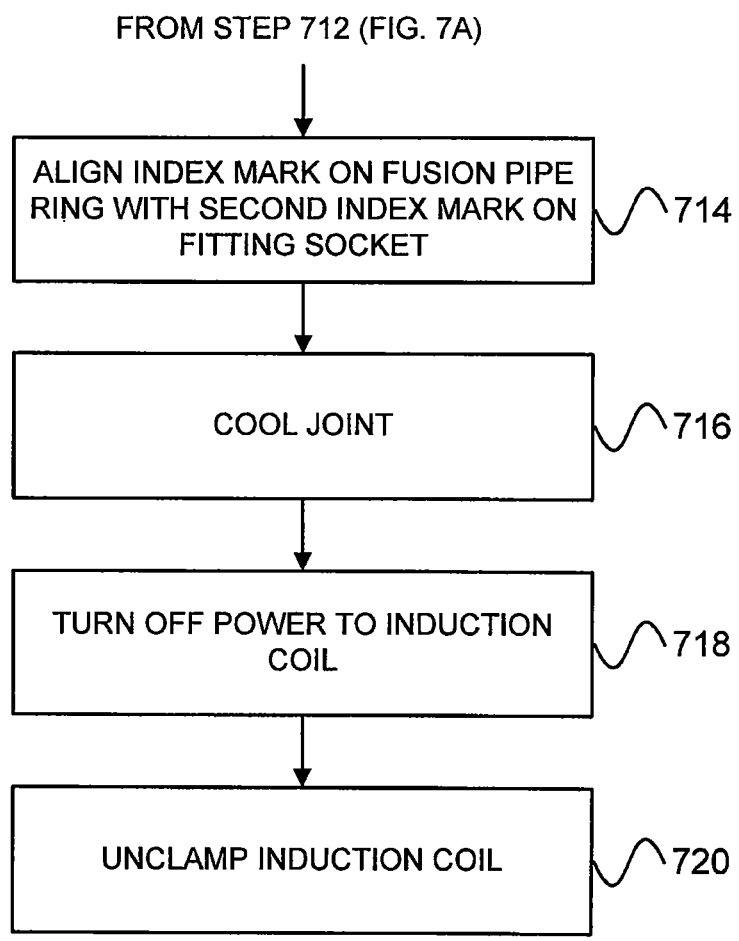

FIG. 7A and FIG. 7B show a flowchart of steps summarizing a method, according to an embodiment of the invention, for electromagnetic bond welding of a thermoplastic pipe to a thermoplastic fusion pipe socket (part of a fitting) via a thermoplastic fusion pipe ring. Refer to FIG. 3A-FIG. 3H for references to components. In step 702, a fusion pipe ring 330 is seated into a fusion pipe socket 350 by screwing it in part way. The process then passes to step 704, in which a pipe 310 is inserted into the fusion pipe ring 330 and seated in the fusion pipe socket 350 (for example, pressed against a step face in some embodiments). The process then passes to step 706, in which the fusion pipe ring 330 is tightened to a first position relative to the fusion pipe socket 350. For example, fusion pipe ring 330 is tightened until an index marker on fusion pipe fitting 330 is aligned with a first index marker on the fusion pipe socket 350.

The process then passes to step 708, in which an induction coil (see FIG. 2A and FIG. 2B) is clamped around the fusion pipe socket 350. The process then passes to step 710, in which power to the induction coil is turned on. The process then passes to step 712, in which the joint region [at least a portion of the susceptor layer on fusion pipe ring 330 and at least a portion of the adjoining region of the fusion pipe ring 330, fusion pipe socket 350, and pipe 310] are heated to fusion temperature (joint region is melted). As discussed above, the temperature profile (temperature vs. time) during the heating stage is controlled by programmable power supply 212 (see FIG. 2B).

The process then passes to step 714, in which the fusion pipe ring 330 is further tightened to a second position; for example, until the index marker on the fusion pipe ring 330 is aligned with a second index marker on the fusion pipe socket 350. In an embodiment of the invention, the body of the fitting (as shown, for example, in FIG. 6A-FIG. 6H) to which fusion pipe socket 350 is connected is manipulated by a tool, and fusion pipe ring 330 is manipulated by another tool. Fusion pipe ring 330 is screwed into fusion pipe socket 350 by turning fusion pipe ring 330, by turning fusion pipe socket 350, or by turning both fusion pipe ring 330 and fusion pipe socket 350. This step compresses the molten region to form a more reliable joint. In addition, alignment of the index marker on the fusion pipe ring 330 with the second index marker on fusion pipe socket 350 indicates that the fusion process has been performed (see FIG. 4A-FIG. 4D).

The process then passes to step 716, in which the joint is cooled. Note that the joint cools as the electromagnetic energy radiated by the induction coil is reduced. The cooling of the joint is a function of thermal transfer processes, such as conduction, convection, and thermal radiation. The induction coil may be turned off and removed. In an embodiment of the invention, the temperature profile (temperature vs. time) during the cooling stage is controlled by the programmable power supply 212. The process then passes to step 718, in which the power to the induction coil is turned off. The process then passes to step 720, in which the induction coil is unclamped.

In another embodiment, the joint is first heated to a temperature (below final fusion temperature) at which the susceptor layer starts to flow, and the fusion pipe ring is tightened. The joint is then heated to fusion temperature.

In the embodiment shown in FIG. 7A and FIG. 7B, there is one cycle of heating and compression. That is, in step 712, the joint is heated to fusion temperature; and, in step 714, the fusion pipe ring 330 is tightened. In other embodiments of the invention, there are two or more cycles of heating and compression. In an example of a two-cycle process, the joint is first heated to a temperature at which the susceptor layer starts to flow, and the fusion pipe ring is tightened (for example, fusion pipe ring is turned until the index marker on the fusion pipe ring moves from a first index marker on the fusion pipe socket to a second index marker on the fusion pipe socket). The joint is then heated to fusion temperature, and the fusion pipe ring is tightened further (for example, fusion pipe ring is turned until the index marker on the fusion pipe ring moves from the second index marker on the fusion pipe socket to a third index marker on the fusion pipe socket).

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A fusion pipe joint assembly comprising:
    a fusion pipe ring comprising:
        a first front face;
        a first rear face;
        a first inside surface region;
        a first outside surface region having a first diameter threaded with an outside thread, wherein the first outside surface region adjoins the front face; and
        a second outside surface region having a second diameter less than or equal to the first diameter;
        wherein at least one of the first outside surface region and the second outside surface region comprises a first thermoplastic material;
    a fusion pipe socket comprising:
        a second front face;
        a second rear face;
        a third outside surface region;
        a second inside surface region having a third diameter threaded with an inside thread configured to engage with the outside thread of the fusion pipe ring, wherein the second inside surface region adjoins the second front face; and
        a third inside surface region having a fourth diameter configured to mate with the second outside surface region of the fusion pipe ring;
        wherein at least one of the second inside surface region and the third inside surface region comprises a second thermoplastic material; and
    at least one of:
        a first susceptor layer disposed between the first outside surface region of the fusion pipe ring and the second inside surface region of the fusion pipe socket; and
        a second susceptor layer disposed between the second outside surface region of the fusion pipe ring and the third inside surface region of the fusion pipe socket.

2. The fusion pipe joint assembly of claim 1, wherein at least one of the first susceptor layer and the second susceptor layer is integrated with at least one of:
    the first outside surface region of the fusion pipe ring;
    the second outside surface region of the fusion pipe ring;
    the second inside surface region of the fusion pipe socket; and
    the third inside surface region of the fusion pipe socket.

3. The fusion pipe joint assembly of claim 1, wherein at least one of the first susceptor layer and the second susceptor layer is a susceptor ring disposed on at least one of:
    the first outside surface region of the fusion pipe ring;
    the second outside surface region of the fusion pipe ring;
    the second inside surface region of the fusion pipe socket; and
    the third inside surface region of the fusion pipe socket.

4. The fusion pipe joint assembly of claim 1, further comprising at least one temperature indicator disposed on at least one of:
    the fusion pipe ring; and
    the fusion pipe socket.

5. The fusion pipe joint assembly of claim 4, wherein the at least one temperature indicator comprises at least one thermochromatic dye.

6. The fusion pipe joint assembly of claim 1, wherein the fusion pipe ring further comprises:
    a fourth outside surface region interposed between the front face and the first outside surface region.

7. The fusion pipe joint assembly of claim 6, further comprising at least one temperature indicator disposed on at least one of:
    the fusion pipe ring; and
    the fusion pipe socket.

8. The fusion pipe joint assembly of claim 7, wherein the at least one temperature indicator comprises at least one thermochromatic dye.

9. A fusion pipe joint assembly comprising:
    a fusion pipe ring comprising:
        a first front face;
        a first rear face;
        a first inside surface region;
        a first outside surface region having a first diameter threaded with an outside thread, wherein the first outside surface region adjoins the front face;
        a second outside surface region having a second diameter less than or equal to the first diameter, wherein the second outside surface region adjoins the first outside surface region; and
        a third outside surface region having a third diameter less than or equal to the second diameter, wherein the third outside surface region adjoins the second outside surface region;
        wherein at least one of the first outside surface region, the second outside surface region, and the third outside surface region comprises a first thermoplastic material;
    a fusion pipe socket comprising:
        a second front face;
        a second rear face;
        a fourth outside surface region;
        a second inside surface region having a fourth diameter threaded with an inside thread configured to engage with the outside thread of the fusion pipe ring, wherein the second inside surface region adjoins the second front face;
        a third inside surface region having a fifth diameter less than or equal to the fourth diameter configured to mate with the second outside surface region of the fusion pipe ring, wherein the third inside surface region adjoins the second inside surface region; and
        a fourth inside surface region having a sixth diameter less than or equal to the fifth diameter configured to mate with the third outside surface region of the fusion pipe ring;
        wherein at least one of the second inside surface region, the third inside surface region, and the fourth inside surface region comprises a second thermoplastic material; and at least one of:
  a first susceptor layer disposed between the first outside surface region of the fusion pipe ring and the second inside surface region of the fusion pipe socket;
  a second susceptor layer disposed between the second outside surface region of the fusion pipe ring and the third inside surface region of the fusion pipe socket; and
  a third susceptor layer disposed between the third outside surface region of the pipe fusion ring and the fourth inside surface region of the fusion pipe socket.

10. The fusion pipe joint assembly of claim 9, wherein at least one of the first susceptor layer, the second susceptor layer, and the third susceptor layer is integrated with at least one of:
  the first outside surface region of the fusion pipe ring;
  the second outside surface region of the fusion pipe ring;
  the third outside surface region of the fusion pipe ring;
  the second inside surface region of the fusion pipe socket;
  the third inside surface region of the fusion pipe socket; and
  the fourth inside surface region of the fusion pipe socket.

11. The fusion pipe joint assembly of claim 9, wherein at least one of the first susceptor layer, the second susceptor layer, and the third susceptor layer is a susceptor ring disposed on at least one of:
  the first outside surface region of the fusion pipe ring;
  the second outside surface region of the fusion pipe ring;
  the third outside surface region of the fusion pipe ring;
  the second inside surface region of the fusion pipe socket;
  the third inside surface region of the fusion pipe socket; and
  the fourth inside surface region of the fusion pipe socket.

12. The fusion pipe joint assembly of claim 9, further comprising at least one temperature indicator disposed on at least one of:
  the fusion pipe ring; and
  the fusion pipe socket.

13. The fusion pipe joint assembly of claim 12, wherein the at least one temperature indicator comprises at least one thermochromatic dye.

14. The fusion pipe joint assembly of claim 9, wherein the fusion pipe ring further comprises:
  a fifth outside surface region interposed between the front face and the first outside surface region.

15. The fusion pipe joint assembly of claim 14, further comprising at least one temperature indicator disposed on at least one of:
  the fusion pipe ring; and
  the fusion pipe socket.

16. The fusion pipe joint assembly of claim 15, wherein the at least one temperature indicator comprises at least one thermochromatic dye.

17. A fusion pipe ring comprising:
  a front face;
  a rear face;
  an inside surface region;
  a first outside surface region having a first diameter threaded with an outside thread, wherein the first outside surface region adjoins the front face;
  a second outside surface region having a second diameter less than or equal to the first diameter;
  wherein at least one of the first outside surface region and the second outside surface region comprises a thermoplastic material; and
  at least one of:
    a first susceptor layer disposed on the first outside surface region; and
    a second susceptor layer disposed on the second outside surface region.

18. The fusion pipe ring of claim 17, wherein at least one of the first susceptor layer and the second susceptor layer is integrated with at least one of:
  the first outside surface region of the fusion pipe ring; and
  the second outside surface region of the fusion pipe ring.

19. The fusion pipe ring of claim 17, wherein at least one of the first susceptor layer and the second susceptor layer is a susceptor ring disposed on at least one of:
  the first outside surface region; and
  the second outside surface region.

20. The fusion pipe ring of claim 17, further comprising at least one temperature indicator disposed on the fusion pipe ring.

21. The fusion pipe ring of claim 20, wherein the at least one temperature indicator comprises at least one thermochromatic dye.

22. The fusion pipe ring of claim 17, further comprising a third outside surface region interposed between the front face and the first outside surface region.

23. The fusion pipe ring of claim 22, further comprising at least one temperature indicator disposed on the fusion pipe ring.

24. The fusion pipe ring of claim 23, wherein the at least one temperature indicator comprises at least one thermochromatic dye.

25. A fusion pipe ring comprising:
  a front face;
  a rear face;
  a first inside surface region;
  a first outside surface region having a first diameter threaded with an outside thread, wherein the first outside surface region adjoins the front face;
  a second outside surface region having a second diameter less than or equal to the first diameter, wherein the second outside surface region adjoins the first outside surface region; and
  a third outside surface region having a third diameter less than or equal to the second diameter, wherein the third outside surface region adjoins the second outside surface region;
  wherein at least one of the first outside surface region, the second outside surface region, and the third outside surface region comprises a thermoplastic material; and
  at least one of:
    a first susceptor layer disposed on the first outside surface region;
    a second susceptor layer disposed on the second outside surface region; and
    a third susceptor layer disposed on the third outside surface region.

26. The fusion pipe ring of claim 25, wherein at least one of the first susceptor layer, the second susceptor layer, and the third susceptor layer is integrated with at least one of:
  the first outside surface region;
  the second outside surface region; and
  the third outside surface region.

27. The fusion pipe ring of claim 25, wherein at least one of the first susceptor layer, the second susceptor layer, and the third susceptor layer is a susceptor ring disposed on at least one of:
  the first outside surface region;
  the second outside surface region; and
  the third outside surface region.

28. The fusion pipe ring of claim 25, further comprising at least one temperature indicator disposed on the fusion pipe ring.

29. The fusion pipe ring of claim 28, wherein the at least one temperature indicator comprises at least one thermochromatic dye.

30. The fusion pipe ring of claim 25, further comprising a fourth outside surface region interposed between the front face and the first outside surface region.

31. The fusion pipe ring of claim 30, further comprising at least one temperature indicator disposed on the fusion pipe ring.

32. The fusion pipe ring of claim 31, wherein the at least one temperature indicator comprises at least one thermochromatic dye.

33. A fitting comprising at least one fusion pipe socket, the at least one fusion pipe socket comprising:
a front face;
a rear face;
an outside surface region;
a first inside surface region having a first diameter threaded with an inside thread, wherein the first inside surface region adjoins the front face; and
a second inside surface region having a second diameter less than or equal to the first diameter;
wherein at least one of the first inside surface region and the second inside surface region comprises a thermoplastic material; and
at least one of:
a first susceptor layer disposed on the first inside surface region; and
a second susceptor layer disposed on the second inside surface region.

34. The fitting of claim 33, wherein at least one of the first susceptor layer and the second susceptor layer is integrated with at least one of:
the first inside surface region; and
the second inside surface region.

35. The fitting of claim 33, wherein at least one of the first susceptor layer and the second susceptor layer is a susceptor ring disposed on at least one of:
the first inside surface region; and
the second inside surface region.

36. The fitting of claim 33, further comprising at least one temperature indicator disposed on the at least one fusion pipe socket.

37. The fitting of claim 36, wherein the at least one temperature indicator comprises at least one thermochromatic dye.

38. A fitting comprising at least one fusion pipe socket, the at least one fusion pipe socket comprising:
a front face;
a rear face;
an outside surface region;
a first inside surface region having a first diameter threaded with an inside thread, wherein the first inside surface region adjoins the front face;
a second inside surface region having a second diameter less than or equal to the first diameter, wherein the second inside surface region adjoins the first inside surface region; and
a third inside surface region having a third diameter less than or equal to the second diameter, wherein the third inside surface region adjoins the second inside surface region;
wherein at least one of the first inside surface region, the second inside surface region, and the third inside surface region comprises a thermoplastic material; and
at least one of:
a first susceptor layer disposed on the first inside surface region;
a second susceptor layer disposed on the second inside surface region; and
a third susceptor layer disposed on the third inside surface region.

39. The fitting of claim 38, wherein at least one of the first susceptor layer, the second susceptor layer, and the third susceptor layer is integrated with at least one of:
the first inside surface region;
the second inside surface; and
the third inside surface region.

40. The fitting of claim 38, wherein at least one of the first susceptor layer, the second susceptor layer, and the third susceptor layer is a susceptor ring disposed on at least one of:
the first inside surface region;
the second inside surface region; and
the third inside surface region.

41. The fitting of claim 38, further comprising at least one temperature indicator disposed on the at least one fusion pipe socket.

42. The fitting of claim 41, wherein the at least one temperature indicator comprises at least one thermochromatic dye.

* * * * *